(No Model.)

H. M. GODFREY.
CULTIVATOR ADJUSTABLE SHOVEL BLOCK.

No. 356,361. Patented Jan. 18, 1887.

Attest:
Charles Pickles
F. A. Hopkins

Inventor:
Henry M. Godfrey
By Knight Bro.
Attys

United States Patent Office.

HENRY M. GODFREY, OF JONESBURG, MISSOURI.

CULTIVATOR ADJUSTABLE SHOVEL-BLOCK.

SPECIFICATION forming part of Letters Patent No. 356,361, dated January 18, 1887.

Application filed May 29, 1886. Serial No. 203,649. (No model.)

*To all whom it may concern:*

Be it known that I, HENRY M. GODFREY, of Jonesburg, in the county of Montgomery and State of Missouri, have invented a certain new and useful Improvement in Cultivator Adjustable Shovel-Blocks, of which the following is a full, clear, and exact description, reference being had to the accompanying drawings, forming part of this specification, and in which—

Figure 1:
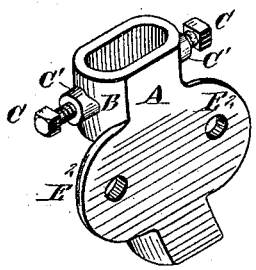
Figure 2:
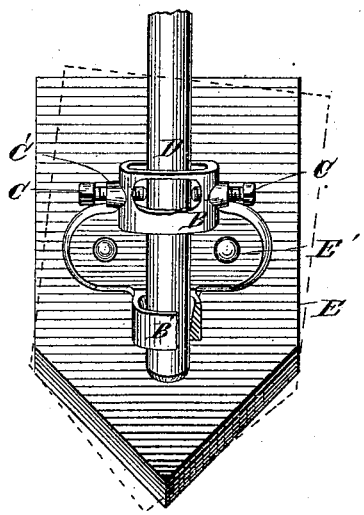
Figure 3:
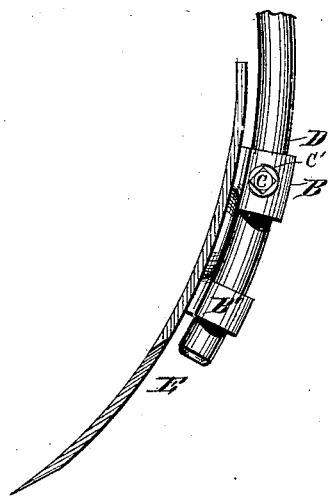

Figure 1 is a perspective view of my bracket or block, showing the elongated collar with its set-screws for the adjustment of the shovel. Fig. 2 is a rear view of the block and shovel with part of the collars broken away to show construction and the action of the set-screws, and Fig. 3 is a side view of the shovel and blocks.

My invention relates to improvements in adjustable shovel-blocks for cultivators; and my invention consists in features of novelty hereinafter fully described, and pointed out in the claims.

Referring to the drawings, in which similar letters of reference indicate like parts, A represents my adjustable block.

B is an elongated socket or collar provided with set-screws C C, that screw in perforated lugs C' at the ends of the collar and securely set the same on the standard D after the lateral vertical or rotary adjustment of the shovel to the position it is required to maintain.

B' is the lower collar, that nearly fits the standard at bottom, but enlarges as it proceeds upward, to give play for the lateral adjustment of the shovel.

E' are the rivets or screw-bolts that pass through the shovel and through holes $E^2 E^2$ in the block and securely fasten them together.

This invention provides the means by which the shovel can be adjusted in either a lateral, rotary, or vertical direction, or in all such directions at the same time, as the operator may desire. By loosening the set-screws, placing the blade or shovel in the position vertically, laterally, and rotary that it is required to maintain, and then tightening the set-screws, it is rigidly held in that position.

Among other advantages of this invention its elongated collar or socket makes it laterally adjustable without (as when such adjustment is obtained by a rotary movement) changing the face presentation of the shovel and throwing it out of line with the line of draft, which of necessity causes an objectionable side draft, that, when obstructions are encountered, causes the shovel to diverge and frequently tear up the plants under cultivation on one side and on the other side throws the earth over plants in the adjacent row.

This block insures the operator perfect adjusting control of the shovel, (by loosening one set-screw and tightening the other,) to cultivate closer to or farther from the plants, either without turning the shovel, or, when desired, the shovel can also be turned to throw the earth either to or from the row of plants. This is also a useful feature in this invention, as great care is needed when the plants are small to so adjust the shovel that it will cultivate near the plant without covering it, and again, as the growth of the plant advances and throws out its lateral roots, to avoid cutting said roots, and yet throw the earth over the weeds that surround the plant, and at the same time bank it, especially in the final plowing.

Corn that has had its final tending with cultivators provided with these adjusting shovel-blocks (when rightly operated) will not fire in a drought, as other fields, in which, from lack of right adjustment of the shovel, many of the lateral roots may have been severed, and from the preservation of the bracing roots and the embankment of the rows (when after the last plowing it is laid by) it is much better prepared to encounter the fall storms that frequently break down the stalks.

It is also evident that when the set-screws are loosened the shovel is capable of vertical adjustment on the standard.

I claim as my invention—

1. In adjustable shovel-blocks for cultivators, the combination of the bracket A, shovel E, bevel socket-collar B', and elongated collar B, arranged to adjust the shovel with its block on the standard D, and by the set-screws C to secure it there, all substantially as described, and for the purpose set forth.

2. In adjustable shovel-blocks for cultivators, the bracket A, secured to the shovel and arranged in combination with the bevel socket-collar and elongated collar, and set-screws working in perforated lugs C' in said collar, to laterally adjust the shovel on the standard and secure it there, all substantially as described, and for the purpose set forth.

HENRY M. GODFREY.

In presence of—
CHAS. T. MADING,
W. E. CALVERT.